Oct. 24, 1967   C. E. SWANSON   3,348,470
WAFFLE BAKER OR THE LIKE
Filed April 4, 1966   4 Sheets-Sheet 1
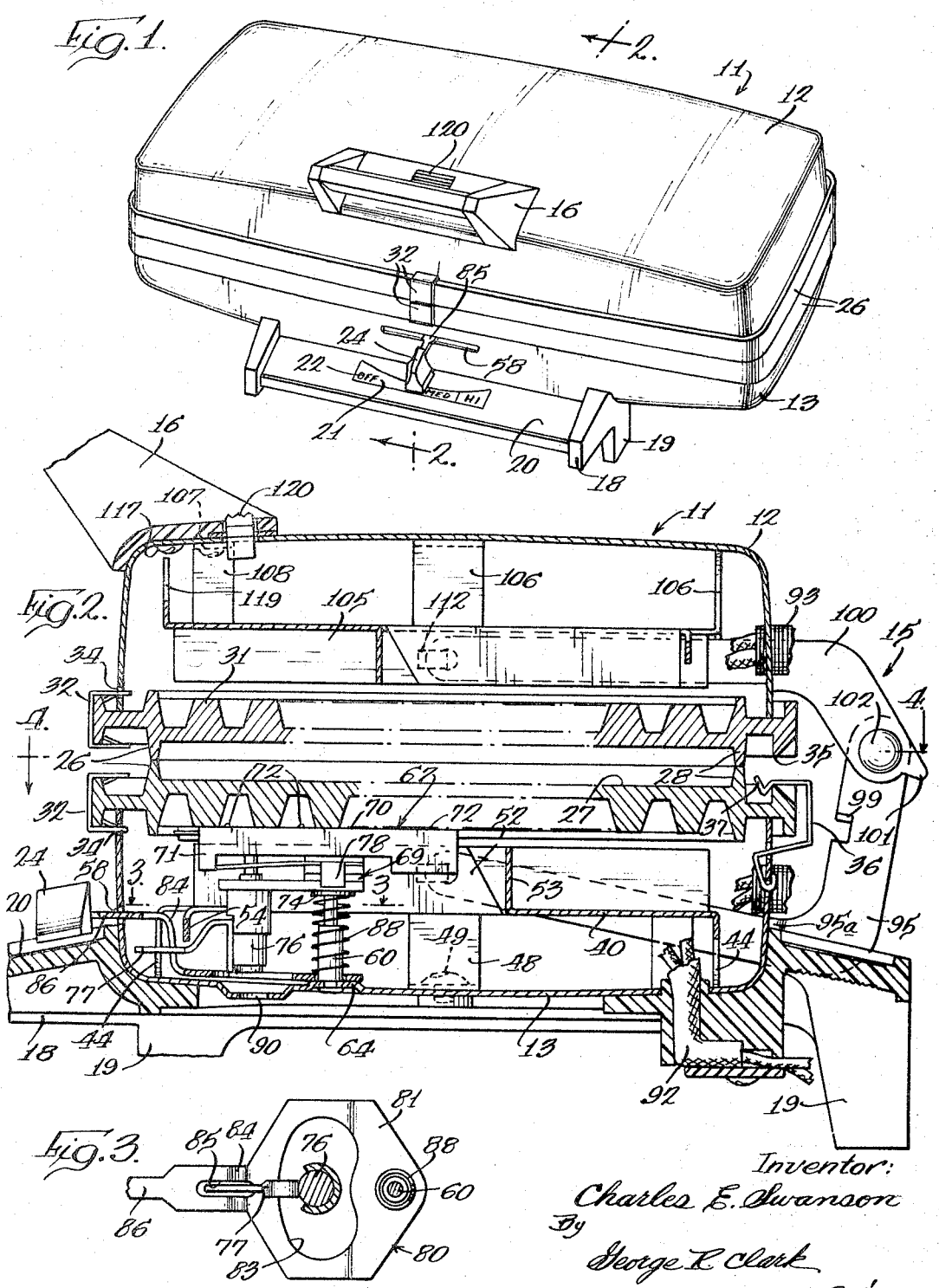
Inventor:
Charles E. Swanson
By George R. Clark
Atty

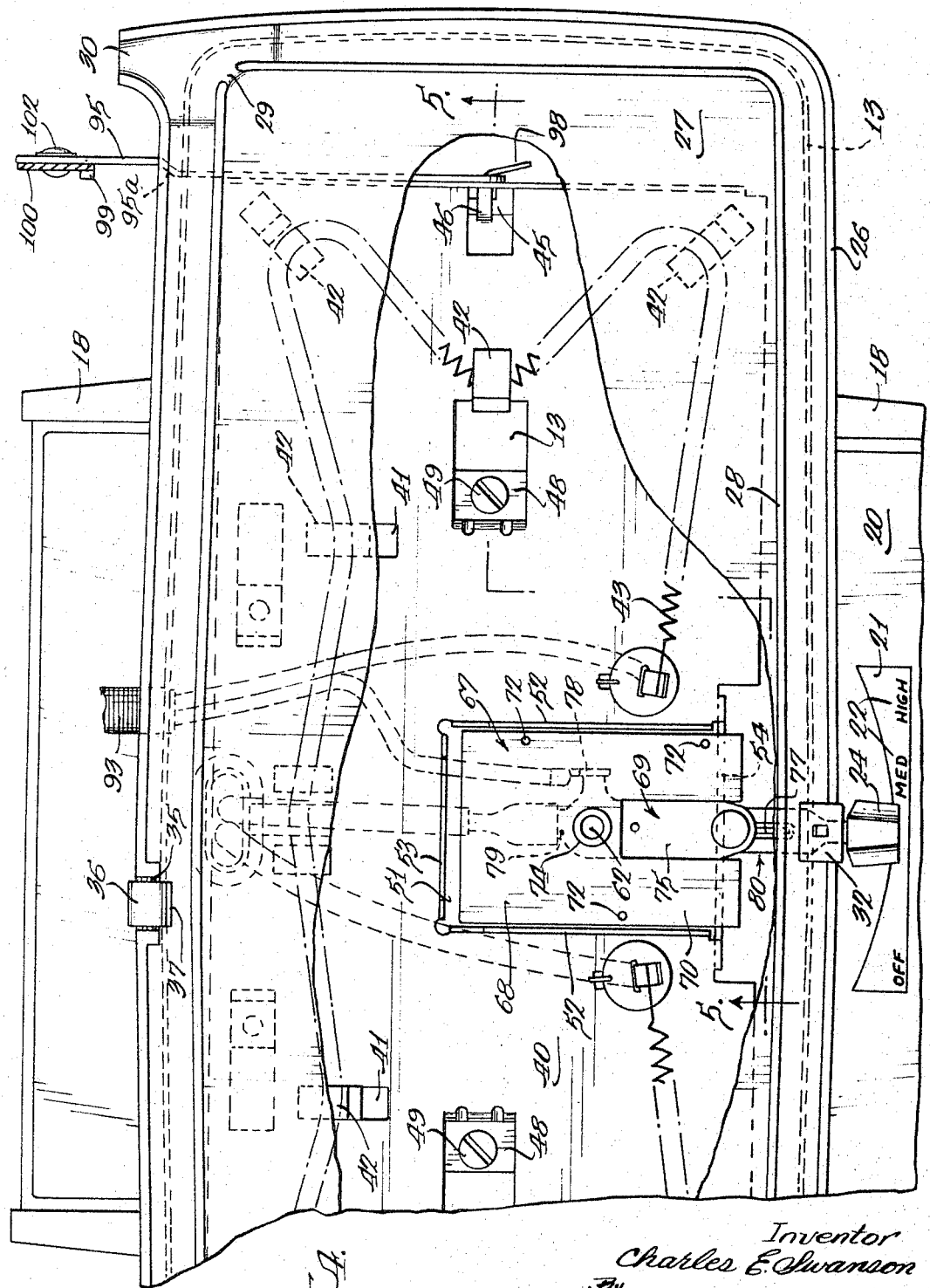

Inventor
Charles E. Swanson
By George R. Clark
Atty

Oct. 24, 1967  C. E. SWANSON  3,348,470
WAFFLE BAKER OR THE LIKE

Filed April 4, 1966  4 Sheets-Sheet 4

Inventor
Charles E. Swanson
By George R. Clark
Atty

United States Patent Office 3,348,470
Patented Oct. 24, 1967

3,348,470
WAFFLE BAKER OR THE LIKE
Charles E. Swanson, Chicago, Ill., assignor to Sunbeam Corporation, Chicago, Ill., a corporation of Illinois
Filed Apr. 4, 1966, Ser. No. 539,701
21 Claims. (Cl. 99—331)

The present invention relates to improvements in waffle bakers or the like and more particularly to improved thermostat mounting and heating element frame mounting in low cost waffle bakers.

While large, expensive waffle bakers are popular, there is a growing demand for smaller inexpensive units which are able to function as either a waffle baker or a grill. In combination waffle bakers and grills, the cooking plate is reversibly mounted so that either the corrugated waffle pattern surface or the flat griddle surface is exposed. With a reversible cooking plate, the thermostat assembly should be mounted for vertical movement and biased toward the plate to sense and control the temperature thereof. It should be appreciated that with reversible cooking plates, the relative position of the bottom surface varies depending upon which cooking surface is facing upwardly. While the thermostat assembly is movable in a vertical direction, the manually operated temperature control member should move in a single horizontal plane to cooperate with temperature setting indicia disposed on a stationary panel. Thus, it is necessary to interrelate the control member and the thermostat assembly in a manner to permit the heretofore mentioned movements and, at the same time, employ inexpensive, sturdy construction.

In addition, the upper and lower housings should be hinged together so that the unit may operate as a conventional waffle baker and also swing open to 180° whereby both housings are horizontally disposed for use as a grill. In order for the unit to have a low manufacturing cost and still function effectively, it is desirable for the hinge assembly to assist in locking the heating element frame or tray to the housing.

Since accurate temperature control is desirable when using the unit as either a waffle baker or grill, a problem is presented if a single thermostat is employed because the thermostat comes in contact with the relatively flat surface of the cooking plate when used as a waffle baker and comes in contact with an irregular cooking plate surface when used as a grill. Naturally, the heat transfer between the thermostat which is biased against the relatively flat surface is considerably greater than when biased against an irregular waffle pattern surface. Thus, there is a need for means permitting the thermostat to receive approximately the same heat whether in contact with the flat grill surface or the waffle pattern surface.

Therefore, it is an object of the present invention to provide a waffle baker or the like which is easily manufactured and low in cost.

A further object of the present invention is to provide a waffle baker or the like which employs a relatively small, commercially available thermostat in an assembly which is vertically movable and is regulated by a horizontally movable control member.

Still a further object of the present invention is to provide a waffle baker or the like with a thermostat assembly which is upwardly biased toward a removable cooking plate and is adjusted by means of a short pivotal lever wherein a horizontally pivoted member controls the thermostat lever movement and the lever rotates through a greater arc than the member.

Another object of the present invention is to provide a waffle baker or the like which has a spring biased thermostat assembly mounted for vertical movement and a control thermostat member which pivots in a horizontal plane wherein the member is spring loaded for smooth operation by the biasing spring.

An additional object of the present invention is to provide a waffle baker or the like having two housings which are interrelated by hinge means which cooperate in securing a heating element tray to the housing.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 1 is a perspective view of an improved waffle baker or the like embodying my invention;

FIG. 2 is a fragmentary sectional view taken substantially on line 2—2 of FIG. 1;

FIG. 3 is a fragmentary view taken substantially along line 3—3 of FIG. 2;

FIG. 4 is a fragmentary view taken along line 4—4 of FIG. 2 with a portion of the grill plate cut away to better illustrate the heating element tray and thermostat assembly;

Figure 5:
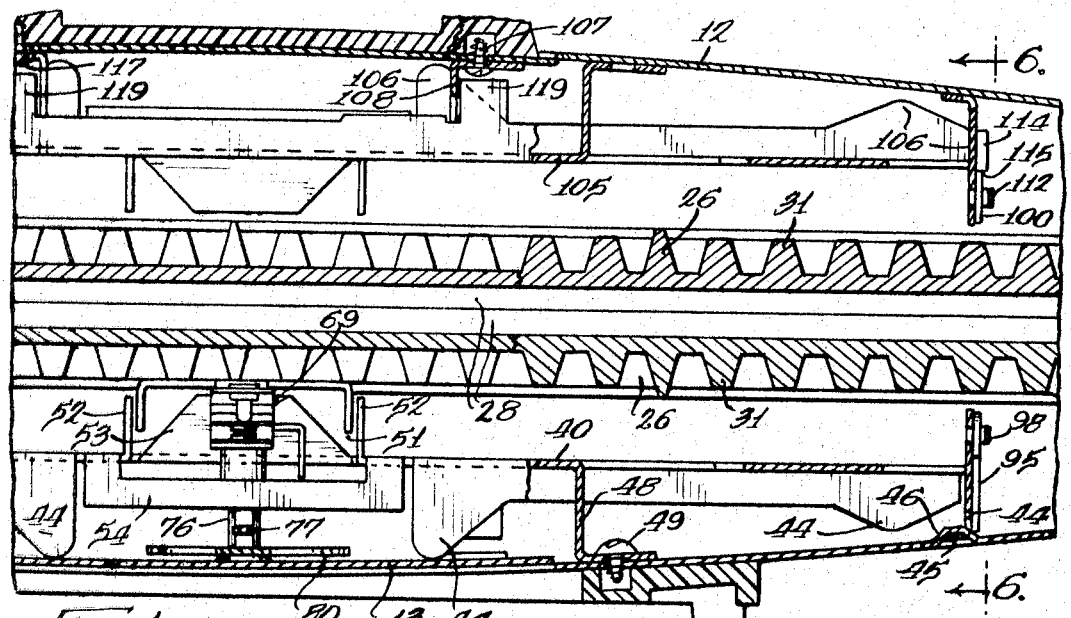
FIG. 5 is a fragmentary sectional view taken along line 5—5 of FIG. 4 assuming that the complete waffle baker is shown in FIG. 4.

The present invention relates to waffle bakers or the like having a cup-shaped housing with a horizontally extending slot in one wall thereof and a vertical post attached to the bottom of the housing spaced from the slot. A thermostat assembly is mounted on the post so that it may slide vertically. A manually operated temperature control member is pivotally attached to the post and extends through the housing slot. Disposed on the post between the thermostat assembly and member is a spring for biasing the assembly upwardly and causing the member to move smoothly. Further, the thermostat assembly has an adjustment lever which is interrelated with the member so that the pivotal movement of the member causes the lever to swing through a greater arc than the member.

Referring to the drawings in which like numerals designate like parts throughout the several views, a combination waffle baker and grill is designated generally by the reference numeral 11. The waffle baker 11 includes an upper housing 12 and a lower housing 13, both of which are generally cup-shaped and mounted in opposed relationship so that the open portion of each housing is facing one another. Connecting both housings is a hinge assembly 15 which permits the upper housing 12 to pivot with respect to the lower housing 13. In FIGS. 1 and 2, the waffle baker 11 is illustrated in the closed position. When desired, the hinge assembly 15 permits the upper housing 12 to pivot to an open position wherein the upper housing 12 is extended upwardly. In addition, the upper housing 12 may swing a full 180° from its closed position to a position in which both housings are horizontally disposed in juxtaposition. To facilitate movement of the upper housing 12, a handle 16 is secured thereto and performs the dual function of providing means for easily manipulating the housing and also constituting a support member when the upper housing 12 is swung 180° to the open, horizontal position. Supporting the waffle baker is a plastic base 18 having a plurality of feet 19. As illustrated, the base 18 extends transversely across the bottom of the lower housing 13 and projects beyond both front and back thereof to add stability to the appliance and to afford handle means for lifting the appliance. Along the front of base 18 is a panelled section 20 which is horizontally disposed and supports an escutcheon 21 bearing indicia 22 for assisting in the selection of the proper operating temperature of the waffle baker. Disposed immediately above the escutcheon 21 is a knob 24 which controls the operating temperature of the waffle baker and also turns the unit on and off. The knob 24 performs the dual function of both manually operable control and a temperature indicating member.

Closing each housing is a removable and reversible cooking plate or grid 26. Each grid 26 has a griddle surface 27 bordered by a ridge 28. For the purpose of allowing grease to be conveniently removed from the griddle surface 27, the ridge 28 has an opening 29 adjacent to one corner of the grid and that corner has an integral pouring spout 30. The other side of the grid 26 contains the normal waffle corrugated pattern surface 31. In the present embodiment, the waffle surface 31 contains four individual waffle sections. For the purpose of attaching the grids 26 to the housings 12 and 13, the grids are provided with U-shaped retaining clips 32 which are adapted to lock in engagement with openings 34 in the side walls of each housing. On the opposite side of the grid from retaining clip 32, there is provided a recess edge 35. Locking the grids in position is a spring clip 36 which is secured to the side wall of each housing. The spring clips 36 are designed so that a V-shaped portion 37 can snap over the recessed edge 35 for retaining the grid 26 to the respective housing. When it is desired to remove the grid 26, the spring clip 36 is swung outwardly so that V-shaped portion 37 passes over the recessed edge 35 to release the grid. In this manner, the grids may be easily removed from their respective housing for cleaning purposes, or the grids may be quickly reversed in order that the appliance may be used as either a waffle baker or a grill.

Positioned within the lower housing 13 is a frame or tray 40 which defines a plurality of rectangular openings 41 for receiving ceramic members 42. A heating element of the radiant type 43 is supported on the plurality of ceramic members 42. In order to obtain uniform heat transmission to the grid 26, the heating element 43 is arranged to extend along a tortuous path. Since electrical current is passed through the heating element 43, the ceramic members serve both to support the heating element and also to insulate electrically the tray 40 from the heating element. The lower tray 40 is disposed horizontally and positioned immediately below the grid 26 so that uniform heat transmission will be established between the heating element and the grid. To support the tray 40 above the bottom wall of the housing 13, the tray is formed with a plurality of supporting feet 44 which engage the bottom of the housing. Two of the feet 44 which are disposed along the longitudinal center of the tray and each foot is provided with a finger 45 which is insertable through spaced loops 46 struck from the bottom of housing 13. Thus, when fingers 45 are inserted through loops 46, the tray is prevented from moving upwardly. To further maintain the tray 40 in rigid contact with the housing, the tray is integrally formed with two spaced feet 48 for locking the tray to the housing by means of screws 49. It will moreover be appreciated that fingers 45, loops 46 and screws 49 all lie substantially along a common line which is essentially the longitudinal axis of the tray 40. Preferably, a rectangular opening 51 is struck in the tray 40 and is bordered by side flanges 52 and rear flange 53, all of which extend upwardly. Extending across in front of the tray opening 51 is a horizontal integral bar 54 for a purpose to be disclosed hereinafter.

In accordance with the present invention, a horizontally extending slot 58 is defined in the front wall of the lower housing 13 immediately above base panel section 20. It will be appreciated that horizontal opening 58 provides access to the interior of lower housing 13 for controlling the operation of waffle baker 11. Riveted to the bottom of housing 13 is an upright mounting post 60 having a large diameter 61 adjacent to the bottom of the housing and a smaller upper diameter 62. The junction between the small and large diameter of post 60 is defined by a shoulder 63. The post 60 is riveted to the bottom of the housing at a raised portion 64 thereof. To control the temperature of grids 26, there is provided a thermostat assembly 67 having an inverted U-shaped bracket 68 and a bimetallic thermostat 69. The bracket 68 is preferably formed from aluminum or metal which readily conducts heat and consists of a relatively large, flat portion 70 which is horizontally disposed and which is bordered by downturned flanges 71 at each side thereof. The primary purpose of bracket 68 is to transmit heat collected from the grid 26 to the thermostat 69. A plurality of protuberances 72 are struck upwardly from the flat portion 70. The protuberances are spaced so that they do not engage the waffle pattern surface 31 as indicated in FIG. 2. One purpose of the protuberances is to nullify the effect of any irregularity in the grill surface 27 when the grids are mounted for making waffles. Thus, the flat portion 70 of bracket 68 is uniformly spaced from the grill surface 27, and consequently, irregularities in the grill surface do not effect the thermostat setting. To balance the operation of the thermostat 69 with respect to the different surface texture on each side of the reversible grids 26, the protuberances 72 effectively reduce the heat transfer between portion 70 and flat grill surface 27 when the unit is used as a waffle baker to correspond with the heat transfer between the portion 70 and the spaced extended portions of the waffle pattern which contacts the portion 70 when the unit is used as a grill.

Figure 7:
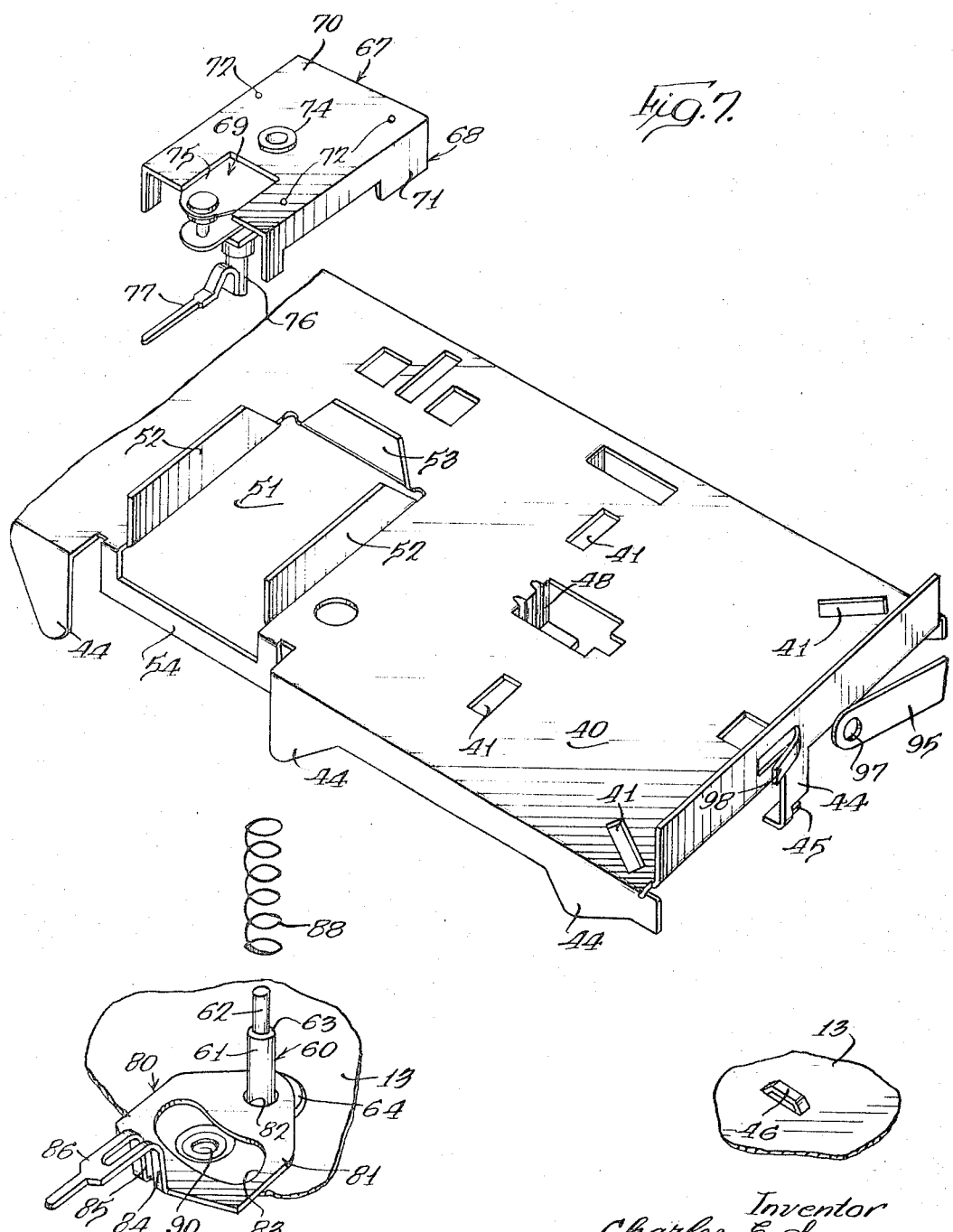
FIG. 7 is an exploded assembly view of the thermostat, heating element tray, spring, control member and portions of the lower housing.

The thermostat 69 is riveted to bracket 68 by a hollow rivet 74, a portion of which is seen in FIGS. 2 and 7. In the present embodiment, the thermostat 69 is relatively small and is a standard commercially available unit. The utilization of a relatively small inexpensive thermostat 69 contributees to the low cost of the waffle baker 11. The detailed construction of the thermostat 69 is not necessary since the details per se form no part of the present invention. However, the thermostat is of the standard stacked type. The thermostat 69 includes a bimetallic element 75 and a temperature adjusting shaft 76 which is in threaded engagement with the assembly and rotates on a vertical axis. A horizontally extending control lever 77 is welded to adjustment shaft 76 and extends below the horizontal bar 54 of tray 40. Two thermostat terminals 78 and 79 are provided to electrically connect the thermostat to the electrical circuit of the waffle baker. Because the commercially available thermostat 69 is designed to operate with bimetallic element 75 exposed to the heat source, the flat portion 70 of bracket 68 is cut away to expose the bimetallic element 75 to grid 26. The cut out portion in bracket flange 71 shown in FIG. 2 is for facilitating the adjustment of the thermostat 69 during the assembly of the thermostat to the bracket.

The thermostat assembly 67 is mounted on post 60 with the small diameter portion 62 entering into the cavity defined by hollow rivet 74 whereby the thermostat assembly 67 may readily slide in the vertical direction. It will be appreciated that the thermostat assembly 67 may move downwardly until rivet 74 engages with post shoulder 63. Moreover, when the thermostat assembly 67 is mounted on post 60, it is positioned within the tray opening 51 and surrounded by flanges 52 and 53 so that the flanges prevent the assembly from rotating on the post and the flanges shield the assembly from radiant energy from the heating element 43.

A key-shaped control member 80 is pivotally connected to the large diameter portion 61 of post 60 and has a remote end 86 which extends through opening 58 on the front side wall of housing 13. The member 80 has an enlarged end 81 defining a round opening 82 which has a greater diameter than the large diameter of post 60 so that the member 80 loosely fits on the post 60 as seen in FIG. 7. Moreover, the enlarged end 81 has a relatively large opening 83 disposed immediately below adjustment shaft 76. The control member 80 includes an upright portion 84 having an elongated slot 85 which extends longitudinally from the enlarged end 81 through the upright portion 84 and into the remote end 86. The elongated slot 85 is radially disposed with respect to the center of round opening 82. Knob 24 is attached to remote end 86 outside of the housing 13. Thus, as knob 24 is manually moved in a horizontal direction, the control lever 80 is rotated about the center of post 60. The horizontally extending thermostat lever 77 projects through elongated slot 84 whereby both lever 77 and member 80 move simultaneously.

It will moreover be appreciated that the center of post 60 is more distant from knob 24 than the center of adjustment shaft 76. Therefore, rotating the member 80 causes the thermostat control lever 77 to swing through a greater arc than the member. With this construction, the thermostat adjustment shaft 76 is swung through a relatively wide arc while the control knob 24 moves through a relatively short arc. It is normally desirable to have the thermostat adjustment shaft move through a relatively large arc in order to obtain efficient control at a moderate cost. Furthermore, the thermostat assembly 67 is permitted to move vertically without interference from the control member 80 since the thermostat lever 77 engages in the slot 85 which extends substantially in a vertical direction. Therefore, when the grids are reversed and the thermostat assembly is moved or displaced vertically, the lever 77 merely moves within the elongated slot 85 of the upright portion 84.

In accordance with the present invention, a coil spring 88 is positioned on post 60 between the control member 80 and the thermostat 69. In this position, the spring 88 biases the thermostat assembly 67 upwardly towards the grid 26. Thus, proper contact is assured between thermostat bracket 68 and the grid 26. Furthermore, spring 88 biases the enlarged end 81 of control member 80 towards the raised portion 64 of the bottom of lower housing 13. Since the fit between opening 82 and post 60 is relatively loose, the control member 80 has a tendency to swing too rapidly and, consequently, convey to the user that the mechanism is carelessly constructed. However, coil spring 88 exerts a downward force on the enlarged end 80 causing the member 80 to swing smoothly and without looseness due to the small amount of friction imposed upon the member. In order to prevent the member 80 from binding against the curved bottom of housing 13, the raised portion 64, which is immediately below and supports the bottom of the enlarged end, raises the lever above the bottom of the housing. It is apparent from this construction that when the grid 26 is removed from the lower housing 13, the thermostat assembly 67 is held within tray opening 51 by lever 77 engaging tray bar 54 which limits the upward travel of the assembly. Moreover, the downward movement of the thermostat assembly is limited by the thermostat rivet 74 engaging with the post shoulder 63.

Preferably, an access opening 90 is formed in the bottom of lower housing 113 immediately below the thermostat adjusting shaft 76. Contained within shaft 76 is an internal temperature setting screw which permits regulating the setting of thermostat 69 by rotating the screw with respect to the shaft 76. Thus, a small screw driver or similar tool may be inserted through opening 90 and past member access opening 83 into shaft 76 for making an appropriate adjustment. So that the internal adjustment may be made at any setting of the control member, the control member opening 83 is sufficiently large to expose shaft 76 at all settings of member 80.

A conventional power cord 92 is used to supply electrical energy to the waffle baker 11. As illustrated in FIG. 2, power cord 92 enters through base 18 and into the bottom of lower housing 13 to be electrically connected with the thermostat 69 and heating element 43 in a well known manner. Furthermore, lead wires from the lower housing 13 extend through a flexible wire conduit 93 into upper housing 12.

Figure 6:
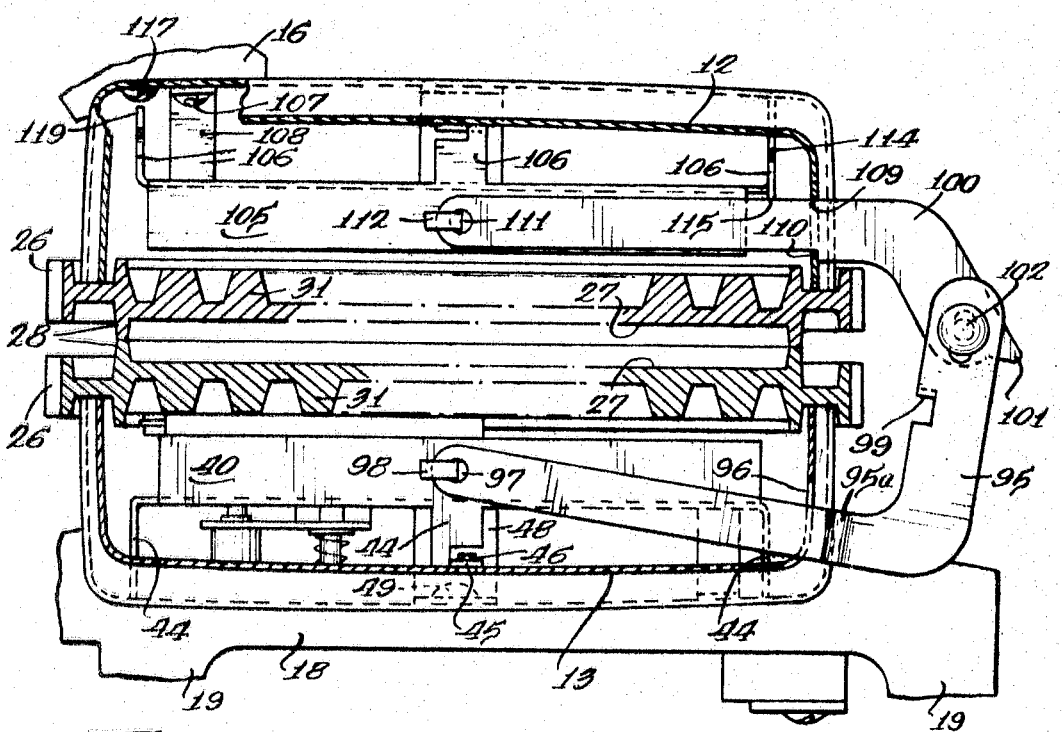
FIG. 6 is a fragmentary sectional view taken along line 6—6 of FIG. 5.

As may be seen in FIG. 6, the hinge assembly 15 includes a pair of upper arms 100 which are pivotally secured by rivets 102 to a pair of lower arms 95 extending through elongated slots 96 in the rear side wall of the lower housing 13. One set of these identical parts are shown in the drawing. The ends of arms 95 have openings 97 through which locking projections 98 from tray 40 extend. Thus, the arms 95 may pivot with respect to tray 40 on the projections 98. The amount of permissive pivotal movement of arms 95 is determined by the length of slot 96. However, the arms 95 are not permitted to move inwardly with respect to housing 13 because the arms 95 are formed with a slight bend portion 95a just outside of slot 96. Since a certain amount of stress is exerted on the tray 40 at projection 98, the projection is disposed in a plane containing the tray locking screws 49 and the connection between fingers 45 and loops 46. Each arm 95 has an integral tab 99 which is disposed to contact upper arms 100 at projection 101. When it is desired to open the upper housing 12, the user grasps handle 16 and pivots the upper housing 12 upwardly until the projection 101 contacts tab 99 which holds the upper housing 12 in a stable, open position.

As indicated hereinbefore, the upper cup-shaped housing 12 is closed by upper grid 26. Disposed within the upper housing 12 is a heating element tray 105 which is identical to the lower tray 40. Obviously, tooling costs are held to a minimum by having the trays identical. However, the upper tray is held to the housing 12 in a different manner than utilized with the lower tray. The upper tray 105 supports a radiant heating element (not shown) in a similar manner employed with the lower tray. Also, the upper tray 105 contains a plurality of spaced supporting feet 106 which engage the roof of the housing 12. For the purpose of securely and rigidly fastening the tray 105 to the upper housing 12 at a minimum cost, only two metal cutting screws 107 (only one of which is shown) are used. Two spaced L-shaped feet 108 are integrally formed with tray 105 near one side thereof and extend to the inside surface of the housing 12 immediately below handle 16. The screws 107 lock feet 108 to the housing with the threaded ends of the screws being hidden within recesses molded in the handle. It should be noted that screws 107 lock the side of the tray 105 which is remote from the hinge assembly 15 to the housing. Upper hinge arm 100 extends through the side wall of housing 12 through an opening 109. The arms 100 are provided with shoulders 110 along their lower edge to prevent movement of the arm inwardly toward the housing. Thus, the shoulder 110 abuts against the upper housing side wall. Furthermore, there is a tight fit between the opening 109 and that portion of arm 100 which passes therethrough. At the inner end of arm 100 is defined an opening 111 which receives a projection 112 from the tray 105. The connection between the opening 111 and projection 112 prevents movement of the arm 100 outwardly from the housing 12. Tray 105 has flanges 114 extending longitudinally at each end adjacent to the hinge assembly 12 and the flanges are formed with edges 115 which abut against the arms 100. There is a slight interference fit between the edges 115 and arms 100 causing the tray 105 to be firmly locked to the housing 12.

Handle 16 is attached to the upper housing 12 by means of two screws 117, as seen in FIGS. 2, 5 and 6. In order to insure that screws 117 which are anchored in the plastic handle do not become loosened and fall into the heating element causing an electric short, the tray 105 has integral flanges 119 extending upwardly to a position immediately adjacent to the heads of screws 117. Therefore, once tray 105 has been assembled to housing 12, screws 117 cannot be withdrawn from the handle 16.

To give a visual indication when the waffle baker 11 is being heated, there is provided a lens 120 which is captured between the handle 16 and the housing 12. A portion of the lens 120 extends within the housing and is positioned to receive and transmit the glow emitted from the radiant heating element supported on tray 105 to indicate that the circuit is energized. Thus, the lens 120 gives a visual indication when the thermostat has opened the electrical circuit to denote that the waffle baker has reached the desired operating temperature.

From the above description, it is apparent that the waffle baker herein described is economical to manufacture and may be operated either as a waffle baker or grill. Moreover, the thermostat assembly is simply constructed and the thermostat assembly is mounted to slide vertically while the control member is operated in a horizontal plane. The trays for supporting the radiant heating element are inexpensively attached to the housing by a tight, rugged construction.

While there has been illustrated and described one embodiment of the present invention, it will be obvious to those skilled in the art that various changes and modifications thereof may be made and it is intended in the appended claims to cover all those changes and modifications as fall within the true spirit and scope of the present invention.

What is claimed as new and desired to be secured by Letters Patent of the United States is:

1. In a waffle baker comprising an inverted cup-shaped housing, a tray disposed within said housing for supporting a radiant heating element on its upper surface, a cooking plate positioned on top of said housing enclosing said tray and heating element, said housing being provided with a horizontally extending slot and a vertically extending mounting post spaced from said slot, thermal responsive means including a metallic bracket which readily conducts heat from said cooking plate, a thermostat secured to said bracket and defining a cavity which is adapted to receive said post in vertical sliding relationship, said thermostat having a horizontally extending lever for adjusting the thermal setting thereof, said lever pivotally mounted on a vertical axis spaced between said thermostat cavity and housing slot, a control member pivotally connected to said post and extending from said post through said housing slot for manipulation by the user, said thermostat lever interlocking with said member at a point intermediate the length of said member whereby the pivotal movement of the member causes the lever to swing through a greater arc than the member moves through.

2. The waffle baker of claim 1 wherein a spring means is disposed on said post between said thermostat and member for biasing the thermostat and bracket toward said plate.

3. The waffle baker of claim 1 wherein means is secured to said tray for preventing rotation of said thermostat.

4. The waffle baker of claim 3 wherein said rotation preventing means includes flanges which are disposed in abutting relationship with said bracket and shielding said bracket and thermostat from said radiant heating element.

5. The waffle baker of claim 1 wherein said member includes a vertical portion having a longitudinally extending slot and said lever projects through said member slot.

6. The waffle baker of claim 1 wherein said thermostat has internal temperature adjustment means disposed on the pivotal axis of said lever, said housing defining an access, said member provided with an opening disposed over said housing access, said member opening being sufficiently large to expose said adjustment means at all positions of said member whereby said adjustment means is adjustable from outside of said housing through said housing access for all positions of said member.

7. The waffle baker of claim 1 wherein said bracket has a relatively large flat portion adjacent said cooking plate, said bracket flat portion including a plurality of protuberances for maintaining a slight gap between said flat portion and plate.

8. The waffle baker of claim 7 wherein said thermostat includes a bimetallic element, said bracket flat portion being cut away to expose said bimetallic element to said cooking plate.

9. In a waffle baker comprising a cup-shaped housing provided with a horizontally extending slot and a vertical post spaced therefrom, a thermostat assembly having a cavity for receiving said post in sliding relationship, a member loosely attached to said post for pivotal movement and extending through said housing slot, spring means disposed on said post between said assembly and member for biasing the assembly upwardly and imposing a small amount of frictional resistance upon said member causing the member to move smoothly.

10. The waffle baker of claim 9 wherein said member is provided with an elongated opening, said assembly including a control lever which extends through said opening whereby both said member and lever move simultaneously, a heating element tray disposed within said housing and having a projection which limits the upward movement of said assembly by said lever engaging said projection.

11. The waffle baker of claim 9 wherein said housing defines a raised portion adjacent said post for reducing the contact between said member and housing.

12. In a heated device including a housing being provided with an elongated opening, a thermostat disposed with said housing and mounted therein for movement in one direction, a member pivotally attached within said housing and extending outwardly through said housing opening, said member having a portion extending in said one direction and said portion defining means extending in said one direction, said thermostat including a pivotal control means extending generally normal to said one direction and engageable with said member means whereby said thermostat is movable in said one direction and the pivotal movement of said member pivots said thermostat control means.

13. In the heated device of claim 12 wherein said housing is provided with a heatable plate, means biasing said thermostat into intimate heat transfer engagement with said plate, said member and thermostat control means being disposed on spaced pivotal axes, said member means including a slot through which said thermostat control means extends.

14. In a waffle baker comprising an upper and lower housing, hinge means secured to both said housings so that said upper housing pivots with respect to said lower housing, a tray disposed within said upper housing for supporting a heating means, said upper housing having a side wall provided with elongated openings, said hinge means including upper arms which extend through said upper housing openings and which have their ends secured to said tray, said arms and upper housing openings being approximately the same size so that said arms are rigidly attached to the upper housing side wall, fastening means securing said tray to said upper housing only at a point remote from said side wall and from the connection between said arms and tray, said tray being provided with a flange extending toward and engaging with said upper housing, said flange positioned between said side wall and the connection between said arms and tray, said flange abutting against said arms for preventing movement of said tray with respect to said upper housing.

15. The waffle baker of claim 14 wherein said tray having a plurality of legs engaging said upper housing, at least one of said legs positioned immediately adjacent to the connection between said arms and tray.

16. The waffle baker of claim 14 wherein a handle is secured to said upper housing by a fastener, said tray provided with an integral projection which extends to adjacent said fastener whereby said fastener cannot be disengaged from said handle.

17. The waffle baker of claim 14 including means preventing longitudinal movement of said arms.

18. The waffle baker of claim 14 wherein said lower housing including a lower tray for supporting a lower heating means, said hinge means being provided with extensions which are pivotally mounted to said lower tray, said lower housing defining integral projections, said lower tray having integral feet which interlock with said housing projections, threaded means locking said tray and lower housing together, and said projections, feet and threaded means lying in a common plane which passes through the center of said tray.

19. The waffle baker of claim 18 wherein said upper and lower trays are identical.

20. In a combination waffle baker and grill device comprising a housing having an opening, a thermostat assembly within said housing and biased toward said opening, a reversible cooking plate having a relatively flat grill surface on one side thereof and a waffle pattern surface with extended portions on the other side adapted for positioning at said housing opening with one side facing inwardly and the other side facing outwardly, means for locking said plate to said housing, said thermostat assembly including a relatively flat heat sensing surface adapted to be biased against said plate, said thermostat assembly surface having a plurality of small protuberances spaced so that they do not engage said waffle pattern surface extended portions when the device is assembled as a grill, said protuberances being sufficiently large to establish a slight gap between said thermostat assembly flat surface and said flat grill surface when the device is assembled as a waffle baker.

21. In a heating device including a heatable plate, a thermostat being provided with a heat sensing surface, means biasing said thermostat surface towards said plate, said plate having a relatively flat surface and an irregular surface both of which are engageable with said thermostat surface, means associated with said thermostat surface for permitting approximately the same heat transfer between said plate flat surface and thermostat surface as between said plate irregular surface and thermostat surface.

References Cited

UNITED STATES PATENTS

| | | | |
|---|---|---|---|
| 1,971,971 | 8/1934 | Walder | 99—331 |
| 2,009,792 | 7/1935 | Uhl | 99—376 XR |
| 2,213,728 | 9/1940 | Allenby | 99—331 |
| 2,214,872 | 9/1940 | Barnes | 99—376 XR |
| 2,342,077 | 2/1944 | Jepson | 99—331 XR |
| 2,361,285 | 10/1944 | Gough | 99—376 XR |
| 2,710,906 | 6/1955 | Lipsich et al. | 99—331 XR |
| 2,765,727 | 10/1956 | Lipsich et al. | 99—376 XR |
| 2,786,928 | 3/1957 | Roll et al. | 99—331 XR |
| 2,895,407 | 7/1959 | Gomersall | 99—379 |
| 2,899,888 | 8/1959 | Koci | 99—376 XR |

BILLY J. WILHITE, *Primary Examiner.*